Sept. 26, 1950
W. N. AXE
2,523,549
DEOXYGENATION OF HYDROCARBONS
Filed June 10, 1946
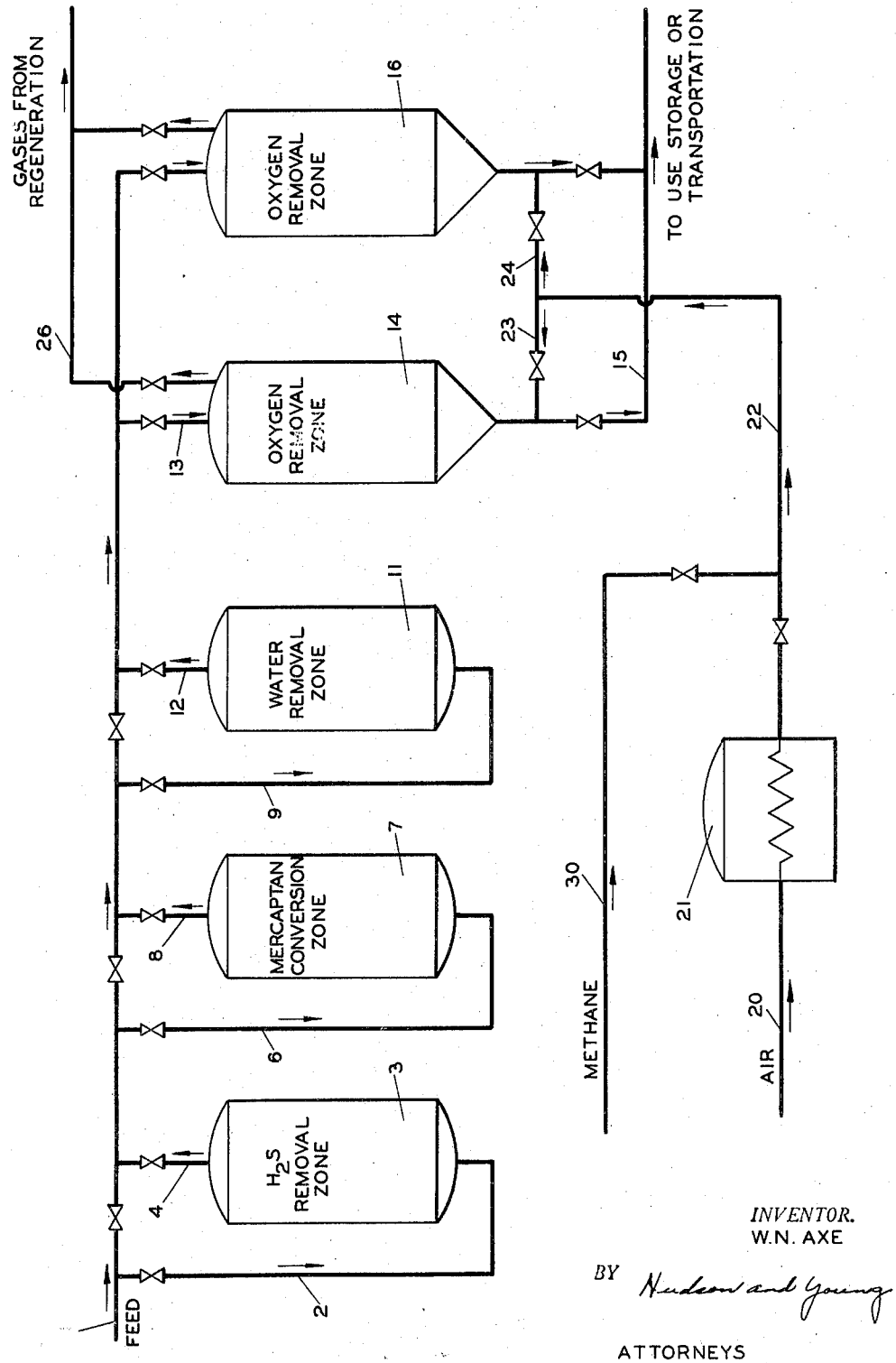
INVENTOR.
W.N. AXE
BY Hudson and Young
ATTORNEYS Patented Sept. 26, 1950

2,523,549

UNITED STATES PATENT OFFICE 2,523,549

DEOXYGENATION OF HYDROCARBONS

William N. Axe, Dewey, Okla., assignor to Phillips Petroleum Company, a corporation of Delaware Application June 10, 1946, Serial No. 675,531

5 Claims. (Cl. 196—23)

1

This invention relates to improvements in processes for removing oxygen from hydrocarbon materials. In one particular aspect it relates to novel reagents for absorbing oxygen from hydrocarbon materials and in another particular aspect it relates to continuous processes for removing oxygen from hydrocarbon streams.

Oxygen is often present in hydrocarbon streams as molecular oxygen in simple solution, as peroxides and in other less clearly understood forms which are in equilibrium with dissolved oxygen. The term "loosely combined oxygen" as used in this disclosure and claims is hereby defined as that oxygen which may be derived from peroxides and other compounds as a result of equilibrium reactions with dissolved molecular oxygen. This invention is directed to the removal of dissolved oxygen and such loosely combined oxygen from hydrocarbon materials.

In many commercial processes and products the presence of dissolved or loosely combined oxygen in hydrocarbon materials is very objectionable. For example it has long been recognized that the presence of dissolved oxygen is a major contributing factor in gasoline pipe line corrosion. It is also well established that the formation of peroxides is the initial stage in the formation of gum in cracked gasoline. The copending applications of Legatski and Crawford, Serial No. 616,930, filed Sept. 17, 1945, now Patent Number 2,468,986, issued May 3, 1949, and Crawford and Morris, Serial No. 617,870, filed Sept. 21, 1945, now Patent Number 2,463,601, issued March 8, 1949, show that dissolved oxygen is a factor causing unpleasant odor to develop in mixtures of highly branched paraffin hydrocarbons.

Heretofore catalytic reduction processes and liquid absorption systems utilizing alkaline cuprous salts have been available for removing oxygen from hydrocarbon streams. These processes have the great disadvantages of being relatively expensive and are often difficult to operate efficiently. A cheap, convenient and efficient process for removing dissolved, admixed and loosely combined oxygen is a greatly needed improvement in the art and may effect considerable conservation of natural gas resources. The removal of oxygen from gaseous hydrocarbons, on an industrial scale, has not hitherto been practiced because of the lack of an economical process. Expensive catalytic reduction processes operating at relatively high temperatures ordinarily cannot be justified economically for the treatment of natural gas streams. As a result of this situation many gas wells are abandoned because the oxygen content of the gas precludes normal utilization in the natural gasoline and fuel gas industries.

It is an object of this invention to provide a continuous process for removing dissolved, admixed and loosely combined oxygen from liquid or gaseous hydrocarbon streams.

Another object is to provide a novel reagent for removing dissolved, admixed and loosely combined oxygen from hydrocarbon materials.

Another object is to provide a process for removing dissolved, admixed and loosely combined oxygen from hydrocarbon materials by use of a solid reagent.

Still another object is to provide a process for removing dissolved, admixed and loosely combined oxygen from hydrocarbon materials which is cheap, convenient and efficient in operation.

Other objects and advantages will become apparent to those skilled in the art as this disclosure proceeds.

I have found that certain organo-cobalt chelate compounds, which are known to absorb oxygen from air at relatively low temperatures at atmospheric and higher pressures and to give up such absorbed oxygen at relatively high temperatures at atmospheric and lower pressures, are also effective for removing dissolved, admixed and loosely combined oxygen from hydrocarbon materials, in spite of the very low partial pressure exerted by oxygen in such materials.

A typical organo-cobalt chelate compound suitable for such removal of oxygen is disalicylalethylenediimine-cobalt, which has the structure

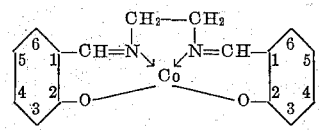

The above compound is commonly known by its proprietary name "Salcomine." Derivatives of disalicylalethylenediimine-cobalt having substituents in the 3 and/or 5 positions of the benzene nuclei are also effective. Such substituents may include: hydroxy, alkoxy, alkyl, nitro, halogen and combinations of these groups; and when a plurality of substituents are present they may be like or unlike. While disalicylalethylenediimine-cobalt is the most practical reagent from the present standpoint of cost and availability, 3 - fluoro - disalicylalethylenediimine-cobalt, 3-ethoxy disalicylalethylenediimine-cobalt and 3-methoxy-disalicylalethylenediimine-cobalt are somewhat more efficient as oxygen-removing agents.

The chemistry of the preparation of the organo-cobalt chelate compounds of this invention is, in general, old in the art. Essentially the steps involved are: (1) interacting salicylaldehyde or an analog thereof with an aliphatic diamine such as ethylenediamine in an aqueous medium which is about 4.5 normal with respect to sodium hydroxide and which contains about 0.28 pound of sodium acetate trihydrate per pound of sodium hydroxide; (2) adding this solution to a dilute solution of cobaltous chloride (about 1.5 weight per cent) in dilute acetic acid (about 2 weight per cent) maintained at about 80° C.; and (3) cooling the reaction mixture and collecting, washing and drying the precipitated product.

It is possible to use the dried precipitate in finely divided form for removing oxygen from hydrocarbon materials but I prefer to convert it to a more efficient contact reagent by mixing it with a filler and binder and pelleting the resulting mixture.

In many instances, however, it is preferred to support the organo-chelate compound on a carrier, whereby greater resistance to attrition, lower pressure drop through the reagent bed and more efficient contacting with a hydrocarbon stream flowing through a bed of reagent may be realized. Such a reagent may be prepared by impregnating an inert, porous, granular material such as fuller's earth, bauxite, pumice or the like with a Schiff's base corresponding to the organo-cobalt chelate compound desired. The impregnated carrier is then soaked or sprayed with the dilute cobaltous chloride solution whereby the organo-cobalt chelate compound is formed in situ within the pores and on the surface of the carrier material. The reagent is then washed and dried prior to use.

Another method for preparing contact reagents is to tumble asbestos fiber with dry powdered organo-cobalt chelate compound.

Drawing

The attached drawing illustrates diagrammatically one preferred manner of conducting the process of my invention. Referring thereto, a hydrocarbon stream enters via line 1. This feed stream may contain any of the usual commercial hydrocarbon materials, either liquid or gaseous, containing dissolved, admixed and/or loosely combined oxygen and may contain hydrogen sulfide, mercaptans, and other impurities. Since hydrogen sulfide and mercaptans tend to inactivate the organo-cobalt reagent and water tends to interfere with proper oxygen absorption, these substances when present must be removed by pretreatment steps.

The incoming feed is accordingly passed via line 2 to a hydrogen sulfide removal zone 3. The hydrogen sulfide free stream issues from zone 3 via line 4 and is conducted to a sweetening zone 7 via lines 1 and 6 and there the mercaptans present are converted to disulfides. The stream passes from zone 7 via lines 8, 1 and 9 to drying zone 11 where it passes over a suitable drying agent such as calcined bauxite. The processes of removing hydrogen sulfide, sweetening and drying may be conducted in zones 3, 7 and 11 by any conventional methods known to be effective. Treatment of the feed in either or all of zones 3, 7 and 11 may be omitted when the corresponding impurity is absent from the incoming feed.

The hydrocarbon stream, free from hydrogen sulfide, mercaptans and water is conducted via lines 12 and/or 1 and 13 to an oxygen removal zone. This zone may have any arrangement desired which secures intimate contact of hydrocarbon stream and reagent but is preferably a tower packed with the organo-cobalt chelate contact reagent prepared as described above.

After contacting the organo-chelate reagent the hydrocarbon stream is withdrawn via line 15 to storage, pipe line or use as desired.

Flow through zone 14 may be continued until the organo-chelate compound has absorbed about 4 per cent of its weight in oxygen. Flow of the incoming stream is then shunted to a second zone 16 similar to zone 14 and operated in the same manner while regeneration of the organo-cobalt reagent is conducted in zone 14.

This is accomplished by passing air or inert gas via line 20 through a furnace 21 and leading the resulting heated air via lines 22 and 23 to zone 14. Regeneration of the reagent is accomplished by heating the reagent to a temperature in the range from 175° to 300° F., but the range from about 200° to about 250° F. is preferred because of convenience, speed of regeneration and ease of preventing damage to the reagent by excess localized heat. Used air and oxygen are vented through line 26. At temperatures much above 300° F. decomposition of the reagent occurs rapidly, but up to 300° F. decomposition is negligible. Regeneration may be conducted at pressures below atmospheric if desired, and longer reagent life may sometimes be secured by such low pressure operation.

When regeneration is complete residual oxygen is swept out of zone 14 by methane or other suitable gas introduced via lines 30 and 23. The hydrocarbon stream is again shunted to zone 14 and zone 16 is placed on regeneration as described.

The temperature in the oxygen removal zone is maintained between 32° F. and 115° F. but should not be as high as the boiling point of a liquid material being treated. For instance oxygen removal from gasoline stream should be conducted at temperatures below about 90° F. The rate of flow through the bed of reagent will be variable and must be adjusted according to the temperature employed, the quantity and type of oxygen present and the completeness of oxygen removal desired. For example, pipeline gasoline often contains about 10 cc. at standard temperature and pressure, of dissolved gaseous oxygen per liter of gasoline and this may be removed by treatment in the temperature range from 32° to 90° F. In the lower part of this range a flow rate of about 10 volumes of liquid per volume of reagent per hour are effective. However, it is more convenient and practical to operate the oxygen removal zone at about 70° to 80° F., and at this temperature somewhat lower rates of flow should be used. The general rule is that higher temperatures cause slower absorption of oxygen by the reagent.

Still slower rates of flow should be used when relatively large quantities of peroxides are present in order to permit decomposition of these materials and removal of the resulting oxygen. Very slow rates of flow are necessary when all traces of oxygen are to be removed as is sometime desirable in certain alkylate materials. In such cases when operating at about 70° to 80° F., flow rates of about 1 to 2 liquid volumes per volume of reagent per hour is recommended. In all cases the rate of flow may be regulated by examining the effluent hydrocarbon stream by methods well known in the art to determine the oxygen content thereof and adopting the highest rate of flow which will give the degree of oxygen removal desired.

Having described my invention and explained its operation, I claim:

1. A process for removing free and loosely combined oxygen from a liquid hydrocarbon stream free from hydrogen sulfide, mercaptans and water and containing not more than 10 c. c. of said oxygen per liter of said hydrocarbon stream which comprises: passing said hydrocarbon stream into an oxygen removal zone; therein intimately contacting said stream at a temperature of from 32° F. to 115° F. and under pressure of from atmospheric to 100 pounds per square inch gauge with a solid reagent comprising a disalicylalethylenediimine-cobalt supported on a porous, inert, granular material, and prepared by impregnating said granular material with a Schiff's base corresponding to said compound desired, contacting said impregnated carrier with a dilute cobaltous chloride solution whereby the disalicylalethylenediimine-cobalt compound is formed in situ within the pores and on the surface of the carrier material.

2. A process of removing free and loosely combined oxygen from a liquid hydrocarbon stream containing hydrogen sulfide, mercaptans and water and not more than 10 cc. of said oxygen per liter of said hydrocarbon stream which comprises: pretreating such hydrocarbon stream to remove hydrogen sulfide, mercaptans and water; passing the resulting pretreated stream to an oxygen removal zone; there intimately contacting said stream at a temperature in the range from 32° F. to 115° F. and under pressure in the range from atmospheric to 100 pounds per square inch gauge with a solid reagent comprising a disalicylalethylenediimine-cobalt supported on a porous, inert, granular material, and prepared by impregnating said granular material with a Schiff's base corresponding to said disalicylalethylenediimine-cobalt compound desired, contacting said impregnated carrier with a dilute cobaltous chloride solution whereby the said disalicylalethylenediimine-cobalt compound is formed in situ within the pores and on the surface of the carrier material; separating said reagent together with absorbed oxygen from said hydrocarbon stream, separating oxygen from said reagent by heating the reagent to a temperature in the range from 175° F. to 300° F. under a pressure of not more than one atmosphere; and contacting the resulting deoxygenated reagent with said hydrocarbon stream in an oxygen removal zone.

3. The process of removing free and loosely combined oxygen from a liquid hydrocarbon stream containing hydrogen sulfide, mercaptans and water as impurities and not more than 10 c. c. of said oxygen per liter of said hydrocarbon stream which comprises: pretreating such hydrocarbon stream to remove hydrogen sulfide, mercaptans and water; passing the resulting pretreated stream to an oxygen removal zone; and intimately contacting said stream at a temperature in the range from 32° F. to 115° F. and under pressure in the range from atmospheric to 100 pounds per square inch gauge with disalicylalethylenediimine-cobalt supported on porous, inert, granular bauxite, and prepared by impregnating said granular material with a Schiff's base corresponding to said disalicylalethylenediimine-cobalt, contacting said impregnated carrier with a dilute cobaltous chloride solution whereby the said disalicylalethylenediimine-cobalt is formed in situ within the pores and on the surface of the carrier material; separating said reagent together with absorbed oxygen from said hydrocarbon stream, separating oxygen from said reagent by heating the reagent to a temperature in the range from 175° F. to 300° F. under a pressure of not more than one atmosphere; and contacting the resulting deoxygenated reagent with said hydrocarbon stream in an oxygen removal zone.

4. The process for removing free and loosely combined oxygen from a hydrocarbon stream containing hydrogen sulfide, mercaptans and water as impurities which comprises: pre-treating such hydrocarbon stream to remove hydrogen sulfide, mercaptans and water; passing a resulting pre-treated stream to an oxygen removal zone; therein intimately contacting said pre-treated stream with a solid reagent comprising a disalicylalethylenediimine-cobalt at a temperature from 32° F. to 115° F. and under a pressure in the range of from atmospheric to 100 pounds per square inch gauge; separating said reagent together with absorbed oxygen from said hydrocarbon stream; separating oxygen from said reagent by heating said reagent to a temperature in the range from 175° F. to 300° F. under a pressure of not more than 1 atmosphere; and reintroducing a resulting deoxygenated reagent into said hydrocarbon stream passed into said oxygen removal zone.

5. The process of removing free and loosely combined oxygen from a liquid hydrocarbon stream containing hydrogen sulfide, mercaptans and water and not more than 10 c. c. of said oxygen per liter of said hydrocarbon stream which comprises: pre-treating such hydrocarbon stream to remove hydrogen sulfide, mercaptans and water; passing a resulting pre-treated stream into an oxygen removal zone, and therein intimately contacting said stream at a temperature in the range from 32° F. to 115° F. and under a pressure in the range from atmospheric to 100 pounds per square inch gauge with 3-fluoro-disalicylalethylenediimine-cobalt supported on porous, inert, granular bauxite, and prepared by impregnating said granular bauxite with a Schiff's base corresponding to said 3-fluoro-disalicylalethylenediimine-cobalt, contacting said impregnated carrier with a dilute cobaltous chloride solution whereby said 3-fluoro-disalicylalethylenediimine-cobalt is formed in situ within the pores and on the surface of said bauxite; separating said reagent together with absorbed oxygen from said hydrocarbon stream, separating oxygen from said reagent by heating said reagent to a temperature in the range from 175° F. to 300° F. under a pressure of not more than 1 atmosphere; and contacting the resulting deoxygenated reagent with said hydrocarbon stream introduced into said oxygen removal zone.

WILLIAM N. AXE.

REFERENCES CITED

The following references are of record in the file of this patent:

UNITED STATES PATENTS

| Number | Name | Date |
|---|---|---|
| 2,115,781 | Morrell | May 3, 1938 |
| 2,278,498 | Shoemaker | Apr. 7, 1942 |
| 2,450,276 | Fogler et al. | Sept. 28, 1948 |
| 2,450,289 | Marek | Sept. 28, 1948 |

OTHER REFERENCES

Bulletin (1938), vol. 13, Chem. Soc. of Japan, pages 252–260.

Bulletin (1938), vol. 13, Chem. Soc. of Japan, pages 579–591.

Bulletin (1938), vol. 13, Chem. Soc. of Japan, pages 252–259.